Feb. 24, 1959 L. A. BOTKIN 2,874,973
TANDEM AXLE VEHICLE SUSPENSION
Filed Jan. 15, 1957 5 Sheets-Sheet 1

INVENTOR.
Lawrence A. Botkin
BY
ATTORNEY.

INVENTOR.
Lawrence A. Botkin
BY
ATTORNEY.

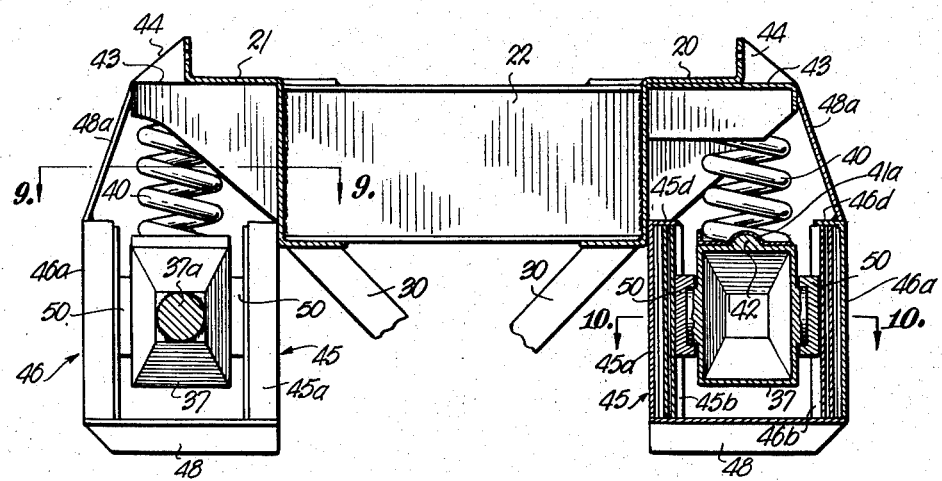
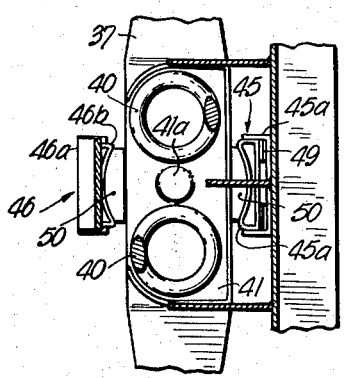
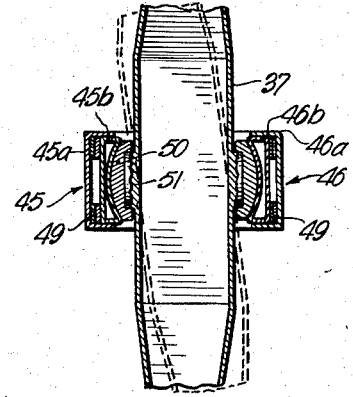
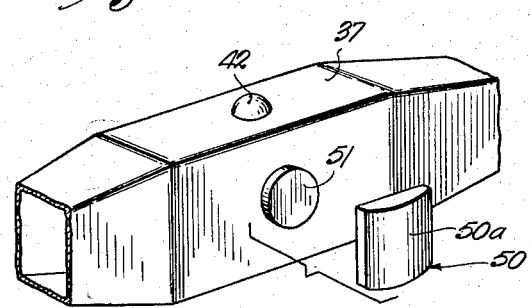

INVENTOR.
Lawrence A. Botkin

United States Patent Office 2,874,973
Patented Feb. 24, 1959

2,874,973
TANDEM AXLE VEHICLE SUSPENSION

Lawrence A. Botkin, Kansas City, Mo., assignor to Butler Manufacturing Company, a corporation of Missouri Application January 15, 1957, Serial No. 634,279

7 Claims. (Cl. 280—104.5)

This invention relates to multiple wheel vehicles and refers more particularly to an improved means for connecting tadem axles with the vehicle.

Heretofore considerable difficulty has been experienced in obtaining a suitable suspension arrangement for trailers or vehicles provided with tandem axles. Included among these difficulties are uneven load distribution to the wheels when the vehicle passes over obstructions and is traveling on rough roads; scuffing of the tires and consequent uneven wear resulting from turning of the unit; "dog walking" of the trailer on crowned roadways; uneven distribution of brake draft and torque reactions to the mounting assembly; and failure of or necessity of providing heavy suspension springs due to forcing them to absorb side and braking forces.

It is a primary object of the present invention to provide a tandem axle mounting for vehicles in which the foregoing problems are eliminated. It is a feature of my invention that I have been able to provide a spring suspension for supporting a trailer on tandem axles in which the springs are not required to absorb either side or braking forces; in which the axles are maintained, during straight line travel, centered beneath the vehicle and normal to the path of advance of the trailer; and in which, despite the foregoing, the axles are free to track with one another about the center of the turn radius during turns and are, as a matter of fact, urged into tracking position.

Another object of my invention is the provision of a tandem axle mounting in which independent articulation of the axles during both straight line travel and turning is permitted, thus maintaining relatively even distribution of the load on the wheels even though the turn maneuver is taking place on rough and uneven terrain.

A further object of the invention is to provide a tandem axle mounting in which the arrangement and manner of connecting the axles is such that the vehicle will tend to recover from a skid automatically.

Still another object of the invention is to provide a tandem axle mounting in which the brake torque reactions are utilized to increase the effective braking forces exerted by the wheel. Stated otherwise, it is an object of this invention to provide a tandem axle mounting in which the brake torque reaction is utilized to cause the trailer to increase the contact pressure of the wheels with the roadway above that supplied by the weight of the trailer alone.

Other objects of the invention are to provide improved means for connecting the axles with the frame; to provide a simple and improved spring suspension between the tandem axles and vehicle; and to provide an improved tandem axle assembly in which parts replacement and repair can be accomplished with ease and facility. A feature of the invention resides in the ready interchangeability of the various parts, thus reducing the first cost and subsequent maintenance to a considerable extent.

Other and further objects of the invention together with the features of novelty appurtenant thereto will appear during the course of the following description.

In the accompanying drawings which form a part of the specification and are to be read in conjunction therewith, and in which like reference numerals indicate like parts in the various views:

Fig. 8 is an enlarged sectional view taken along the line 8—8 of Fig. 1 in the direction of the arrows;

Fig. 9 is a sectional view taken along the line 9—9 of Fig. 8 in the direction of the arrows;

Fig. 10 is a sectional view taken along the line 10—10 of Fig. 8 in the direction of the arrows;

Fig. 11 is a perspective view of the central portion of one of the beams with the circular slide bearing being shown in exploded relation with respect to the beam;

Figure 13:
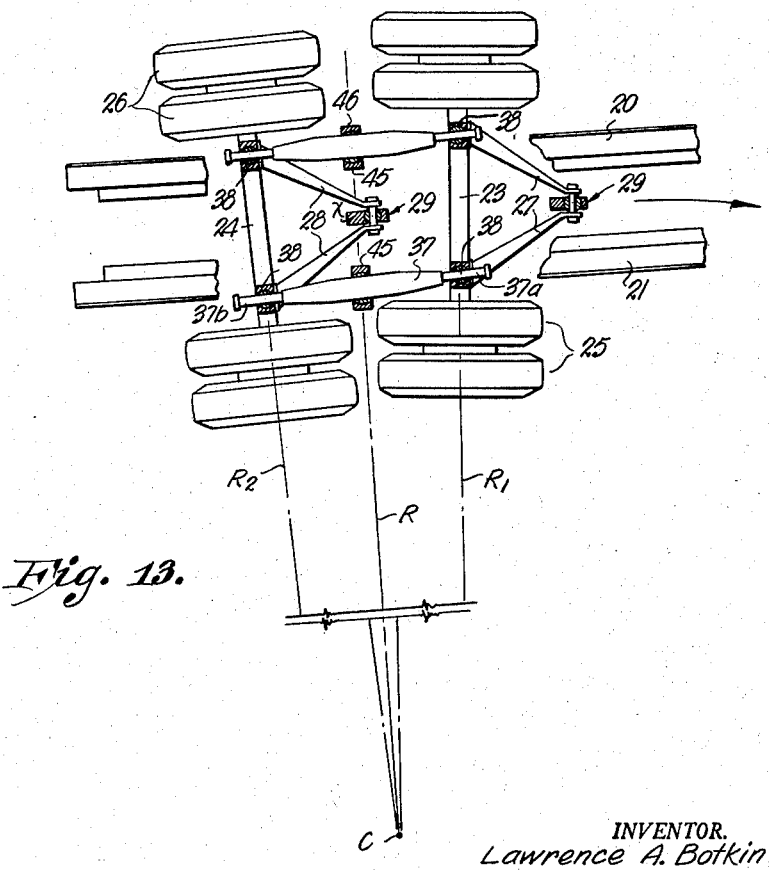
Fig. 13 is a view similar to Fig. 12 but showing the attitude of the wheels and axles relative the frame during a turn maneuver.
Figure 14:
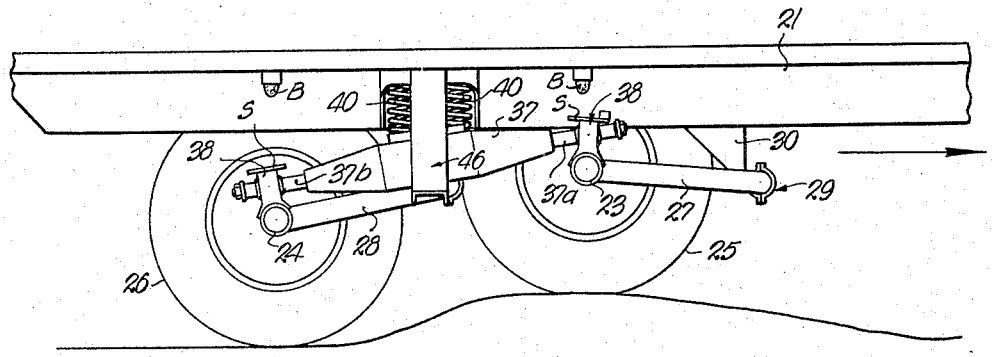
Fig. 14 is a side view of the trailer and suspension illustrating the operation of the unit in passing over bumps or crowns, the wheels on the near side having been removed for purposes of illustration.

In my invention I provide tandem axles which are connected with the vehicle independently of one another, each axle being universally pivoted through suitable draft means to the frame of the vehicle. Spanning the axles are beam members which are so mounted with respect to the axles and frame as to absorb all side forces and transmit them directly to the frame notwithstanding the fact that the frame is supported on the beam by spring means. The beam connection with the axles is such that independent angular movement of the axles is made possible, thus permitting free tracking of the wheels during turn maneuvers as is illustrated generally in Fig. 13. The mounting of the axles is also such that they are adapted for relative vertical movement with respect to one another while maintaining the trailer level as shown in Fig. 14 and can be tilted in opposite directions with respect to the longitudinal center line of the trailer while maintaining the trailer frame substantially level, as illustrated generally in Fig. 15.

Figure 1:
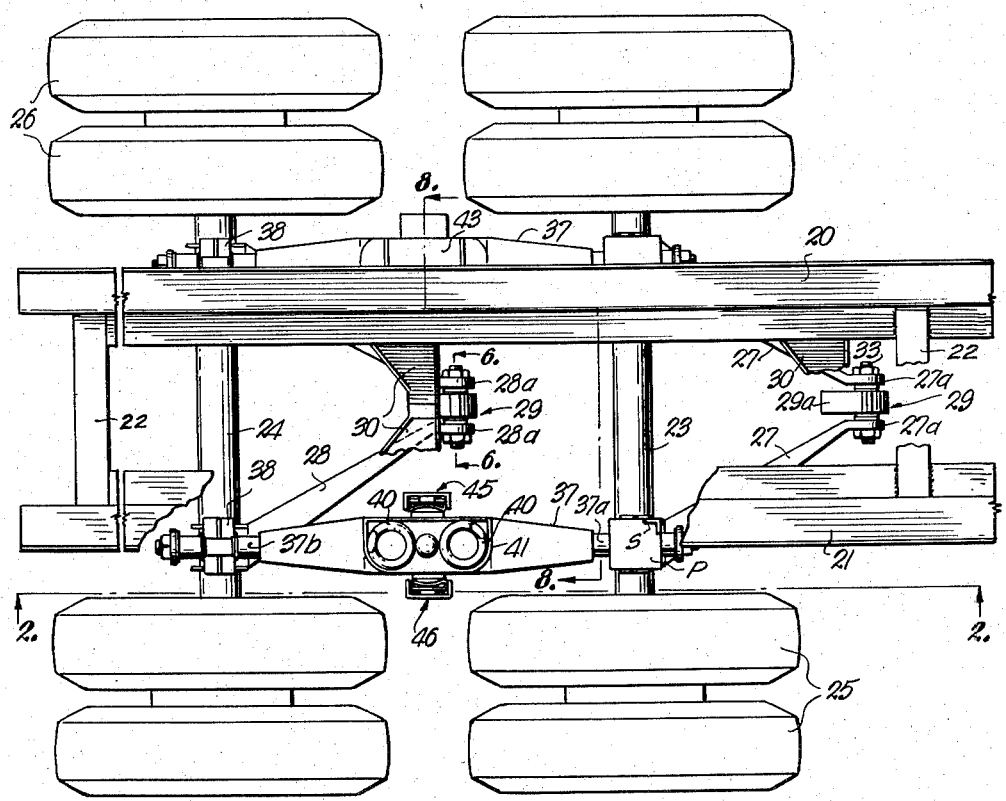
Fig. 1 is a top plan view of a portion of a typical trailer embodying the features of the invention, parts being broken away for purposes of illustration and to indicate length.
Figure 2:
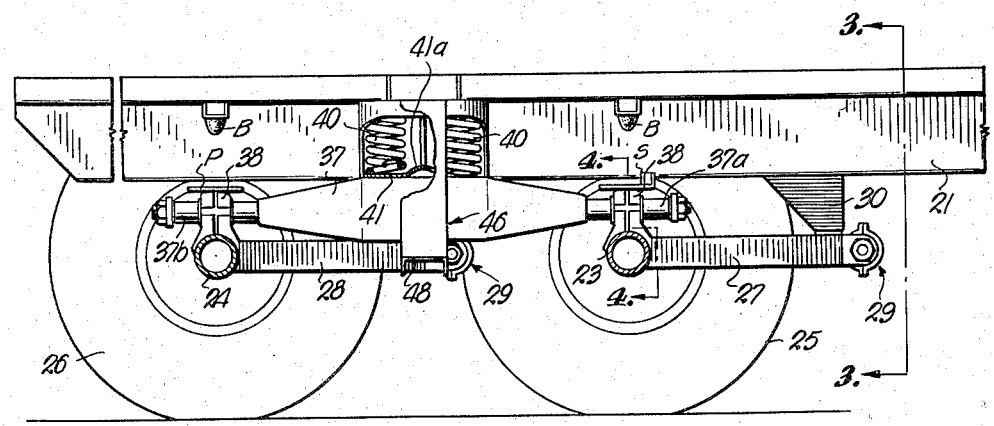
Fig. 2 is a view taken along the line 2—2 of Fig. 1 in the direction of the arrows, parts again broken away for purposes of illustration.
Figure 3:
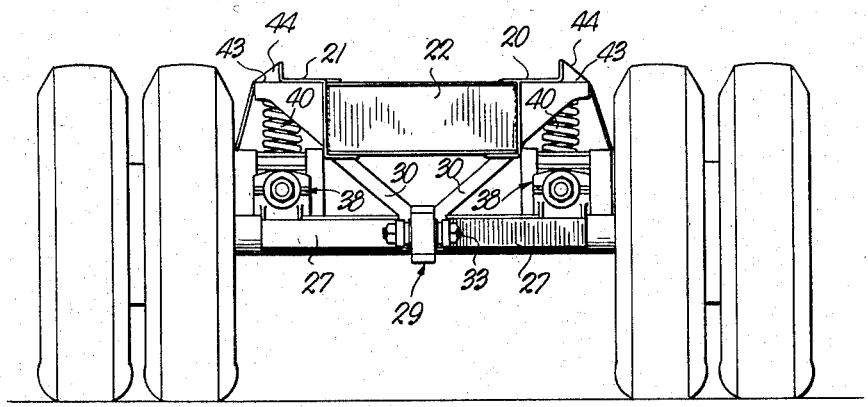
Fig. 3 is a view taken along the line 3—3 of Fig. 2 in the direction of the arrows.

Referring now to Figs. 1, 2 and 3, the trailer chassis or frame is represented by the spaced longitudinal frame members 20 and 21, which are preferably generally Z-shaped in cross section as shown in Fig. 3. The frame members 20 and 21 are rigidly connected with one another by suitable cross beams (such as shown at 22 in Fig. 3) to form a rigid frame structure. It will be understood that the rear portion only of the trailer is shown, and that the front of the trailer is adapted to be connected with any suitable draft means such as a truck (not shown).

Located beneath the trailer chassis and supporting same in a manner later to be described are a pair of tandem axles consisting of a front axle 23 and a rear axle 24. Rotatably mounted at the ends of front axle 23 are front wheels 25, and on rear axle 24 rear wheels 26. The axles 23 and 24 are each independently connected with the trailer chassis by a draft arrangement which in the case of front axle 23 includes the converging draw bars 27 and in the case of the rear axle 24, similar draw bars 28. The draw bars 27 and 28 extend forwardly of their respective axles, being secured at their rearward ends to the axles and converging toward a pair of draft bearings 29 positioned respectively ahead of the front and rear axles.

Figure 6:
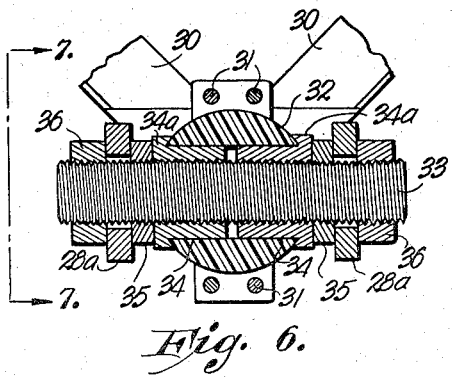
Fig. 6 is an enlarged sectional view taken along the line 6—6 of Fig. 1 in the direction of the arrows.
Figure 7:
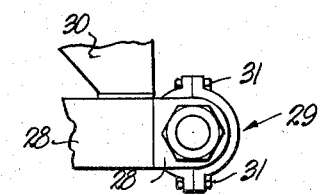
Fig. 7 is a view taken along line 7—7 of Fig. 6 in the direction of the arrows.

The two draft bearings 29 for the front and rear axles are identical in construction and are detailed in Figs. 6 and 7. It will be noted that each bearing is secured directly to the trailer chassis by a depending support structure which includes a pair of downwardly converging struts 30. The struts 30 each have their upper ends secured to the chassis frame members 20 and 21 and the struts in each pair converge downwardly, their lower ends being welded or otherwise secured to a rearward extension 29a on the bearing 29 associated therewith.

Referring again to Figs. 6 and 7, the main body of each bearing structure comprises a generally cylindrical split annular housing, the separate halves of which are bolted together by bolts 31. The inside surface of the housing forms a spherical socket within which is rotatably supported a centrally apertured ball member 32 which may be composed of nylon or any other suitable material. Extending centrally through the aperture in ball member 32 is a threaded shaft 33 of somewhat smaller diameter than the bore of the ball aperture. A pair of internally threaded sleeves 34 are threaded onto the shaft 33 and extend into the bore of the ball. Sleeves 34 are provided with annular flanges 34a which are formed to engage the ball around the margins of the opposite ends of the aperture. Lock nuts 35 abut the sleeves 34 outside the ball to prevent accidental turning thereof. It will be evident that the sleeves 34 serve to firmly secure the ball to the shaft 33.

The draw bars 27 and 28 are secured to the shafts 33 of their respective bearings 29 by spaced parallel extensions 27a or 28a on the forward ends of the draw bars which lie on opposite sides of the ball element and are apertured to fit over shaft 33. The extensions are retained axially on the shaft between the lock nuts 35 and retainer nuts 36 threaded onto the outer ends of the shaft. It will be understood, of course, that while Figs. 6 and 7 show the details of the bearing to which draw bars 28 are connected, the same arrangement is employed for connecting draw bars 27 to the front bearing 29.

It will be evident that the bearings 29 provide a universal pivot through which the axles 23 and 24 are connected to the trailer frame. Thus, the axles 23 and 24 are free to tilt with respect to the longitudinal center line of the trailer; to rise and fall about the axis of their respective shafts 33; and to swing about a vertical axis through the center of the draft bearing associated therewith. It should be noted at this point that preferably the spacing of the bearings 29 ahead of their associated axles 23 or 24 is the same in each case.

The weight of the trailer chassis is carried in a fashion later to be described on a pair of similar beams 37 which preferably have central portions tapering toward the opposite ends and terminating in a forward cylindrical extension 37a and a rear cylindrical extension 37b. The beams 37 are located on opposite sides of the trailer frame, being aligned generally with frame members 20 and 21 and are disposed therebelow. To conserve weight, preferably beams 37 are of a hollow construction as shown on the right hand side of Fig. 8. The beams extend transversely between the axles 23 and 24 with the extensions or end portions 37a and 37b preferably overlying the axle structure where they are received in special supporting members 38 affixed to the respective axles.

Figures 4, 5:
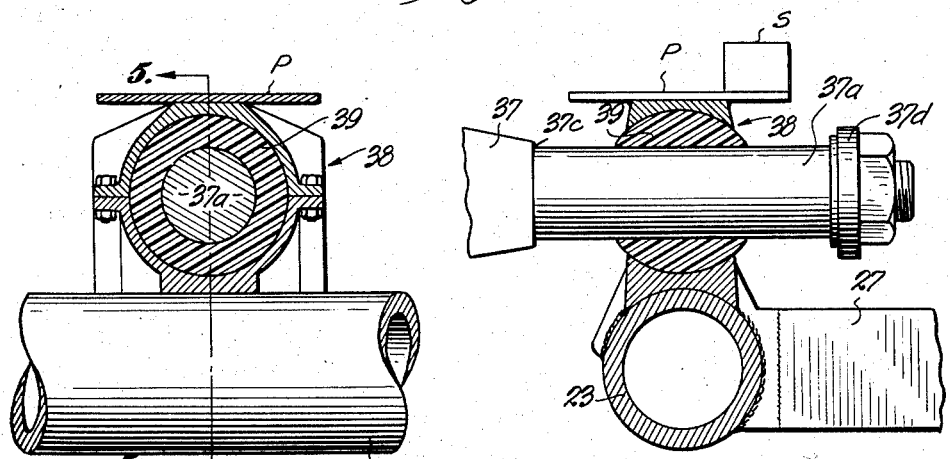
Fig. 4 is an enlarged view through one beam end support, the view being taken generally along the line 4—4 of Fig. 2 in the direction of the arrows.
Fig. 5 is a view taken along the line 5—5 of Fig. 4 in the direction of the arrows.

The four supporting members 38 are basically identical in construction, each consisting (as shown in Figs. 4 and 5) of a housing having two halves secured together and forming a socket having a spherical portion retaining therein a universally rotatable ball element 39. The housings are welded or otherwise firmly secured to the top of the respective axles. Extending centrally through each ball element 39 is a central bore within which are slidably received the cylindrical end portions 37a and 37b of the beams. As will be evident from Fig. 5, the end portion of the beams are long enough to provide for limited axial movement of each extension relative to its ball. A shoulder 37c is provided at the junction of the beam and extension to limit relative movement in one direction and a stop collar or flange 37d is secured to the free end of each extension to limit movement in the opposite direction. The beams and extensions are given dimensions such that when the axles 23 and 24 are parallel, the mid-point of the extensions 37a and 37b of the beam substantially coincide with the centers of the ball elements 39. Thus it will be seen that the beams 37 are firmly supported at each end on the front and rear axles, provision, however, being made through the support elements 38 for relative movement of the axles axially of the extensions and also for relative angular movement in any direction.

Mounted on top of the respective beam support members 38 are stop plates P which, during articulation of the beams and axles, cooperate with resilient bumpers B to limit the maximum movement of the axles relative to the frame. The bumpers B are secured to and depend from the underside of frame members 20 and 21. On the forward plate members P, there are provided upstanding stop flanges S arranged to engage the sides of the frame members 21 and 20 to limit the maximum turning angle, as will later become more apparent.

The load of the trailer chassis is transmitted to the wheels through the beams 37, the chassis being yieldably supported on the beams. In the preferred construction, each beam 37 has surmounted thereon at its midsection a pair of helical compression springs 40 which provide the yieldable support for the chassis. The lower ends of springs 40 are received in a pan-like retainer 41 which is provided with a central raised portion 41a forming a concavity in the underside within which fits a corresponding boss 42 (see Fig. 11) formed on the top of the beam. The cooperation between the boss 42 and concave underside of the raised portion 41a serves to index the retainer 41 in proper position on top of the beam and prevent the retainer from departing from this position during use.

The frame members 20 and 21 of the trailer chassis are seated on the upper ends of springs 40 through the provision of extension plates 43 (Fig. 8) which are welded or otherwise firmly secured to the respective frame members and extend outwardly to overlie and contact the upper ends of the springs. The extending portions of each plate 43 are in turn reinforced against bending by means of gussets 44 which are secured to the adjacent side portions of the frame members and tops of the plates 43, preferably by welding.

One of the important features of my invention resides in the fact that the beams 37 are universally pivoted at their longitudinal midpoints to the frame by a connecting means which permits also limited up and down movement of the beams relative to the frame, the pivot for each beam shifting along with the beam so that the universal pivot characteristic is present regardless of the vertical position of the beams with respect to the frame at any given time. The preferred form of connecting means is best illustrated in Figs. 8–11, inclusive.

As will be noted from the aforementioned figures, the mid-section of each beam 37 is disposed between a pair of spaced vertical guide members comprising an inner guide member 45 and an outer guide member 46. The pairs of guide members 45 and 46 depend respectively from the trailer frame members 20 and 21, the inner guide member including an upright channel member 45a welded at its upper end to the trailer frame and the outer guide member including a similar channel 46a. The lower end of the outer channel 46a is secured to and supported on the outer end of a cross member 48 which is rigidly secured at its inner end to the lower end of the inner channel 45a. The upper end of the outer channel 46a is supported by a tie brace 48a which is secured to and extends downwardly from the edge of plate 43. The lower end of tie brace 48a is secured to the upper end of the channel 46a by welding or otherwise.

As is believed evident from the drawings, channels 45a and 46a are oriented with their flanges in vertical planes confronting the sides of the beams 37. Fitting within the channels and coterminous therewith, and forming the beam confronting portions of guide members 45 and 46, are slide members 45b and 46b. Each of the members 45b and 46b is provided on its beam confronting face with a vertically elongated trough, semicircular in cross section, which extends from the top to the bottom thereof. Shims 49 may be provided between the webs of channels 45a and 46a and their respective slide members 45b and 46b to accurately control the depth to which the slide members seat in the channels. The slides are retained axially within the channels by flanged over lips 45d and 46d at their upper ends and by the cross members 48 at the lower ends. The slide members 45b and 46b may be of hollow construction to permit slight deformation for a purpose later to be described.

As has previously been mentioned, the beams 37 are in each case disposed between their respective guide members 45 and 46. Extending from each side of the beams and connected therewith in a manner later to be described is a bearing member 50 which is generally rectangular in plan, the bearing in each case being provided with a concave semi-cylindrical outer face 50a which is slidably received in the trough of the adjacent slide 45b or 46b. The curvature of the convex faces of bearings 50 and the troughs in slides 45b and 46b is the same. To mount the bearing members 50 on beams 37, each beam is provided on its opposite sides with a cylindrical boss 51. The inner faces of bearings 50 are provided with corresponding cylindrical recesses which meet with the boses 51 to rotatably position the bearing members on the beams.

Due to the cooperative relationship established between the bearing members 50 and the troughs of slides 46b and 45b, the beams are universally pivoted to the frame while still being capable of up and down movement relative thereto. Rotation of the beam about the axis of bosses 51 is provided by the rotatable connection of the bearing members 50 therewith. As shown in the broken lines in Fig. 10 the beam is also adapted to move about a vertical axis through the center thereof, the bearing surfaces in this case being the slidably contacting convex and concave faces of the slides 46b, 45b and of bearing members 50. Since the vertical axis intersects the axis of bosses 51, universal pivoting of the beam relative to the guide members 45 and 46 (and hence the trailer frame itself) is provided.

Figure 12:
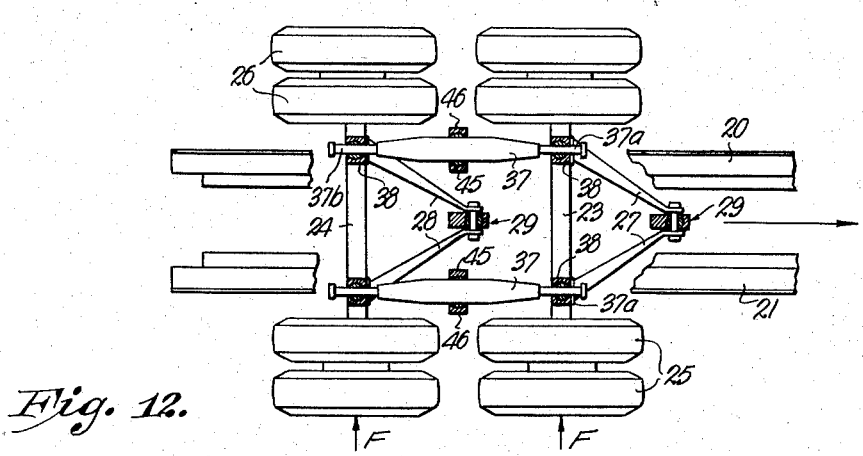
Fig. 12 is a schematic top plan view of a trailer embodying the invention, the central portion of the trailer frame being broken away and the bearings being shown in section.

The operation of the suspension assembly may be best understood by referring to Figs. 12–15, inclusive. In Fig. 12, the trailer is shown as moving forward in a straight line. The front and rear axles 23 and 24 are drawn with the trailer through the thrust connection provided by draw bars 27 and 28 which are universally pivoted to the frame through the draft bearings 29. The axles 23 and 24 are thus parallel to one another and at right angles to the line of travel. The beams 37 are parallel to the line of travel and as has been earlier described, the load of the trailer is yieldably supported on the beams 37 by the springs 40.

One of the valuable features of my invention is that the axles 23 and 24 are maintained in parallel relationship even though side forces may be imposed on the wheels, for example, as may be occasioned by the existence of high cross wind loads on the superstructure (not shown) or when the trailer is traveling on a transversely inclined surface such as is presented by roadways crowned in the center for drainage. In either of these cases a resultant lateral force F (see Fig. 12) tending to force the wheels transversely with respect to the chassis is created and tends to swing the wheels out of line. In my invention, however, the beams 37 firmly resist any tendency of the wheels to thus depart from their centralized position since they are confined against any lateral movement by their respective pairs of guide members 45 and 46. The side forces F are transmitted to the members 38, through the members 38 to the beams 37, and through the beams to the guide members 45 and 46 which, as previously described, are secured directly to the frame. By so confining the beams at their centers against lateral movement the springs 40 are in no way required to resist the side loads. Not only does this facilitate the use of coil rather than leaf springs, but it also obviates the necessity of giving the springs any structural strength other than the strength necessary to resist the compressive loads imposed thereon by the frame.

Despite the operation of the suspension assembly to maintain the wheels in a centralized condition under the circumstances set forth above, the arrangement is such that during a change in direction of travel of the vehicle the front and rear wheels are capable of reorienting themselves so that the wheel planes are tangent to a radius line drawn from the turn center. This condition is illustrated in Fig. 13 of the drawings. In the geometry of this figure X indicates the imaginary center of the ground contact points of the wheels, this being what may be considered the center of resistance to turning of the trailer when the turning moment is applied. The guide members 45 and 46 are so located that the point X lies in a vertical plane passing through the centers thereof. The center of the turn for the trailer suspension assembly is located at C, and R represents a radius from turn center C passing through point X and the centers of the pairs of guides 45 and 46.

As the trailer moves into the turn the lateral movement of the trailer frame displaces the forward draft bearing 29 inwardly toward the turn center causing the front axle 23 to assume an angle with respect to the frame such that the front wheels are tangent to a radius $R_1$ from turn center C. The forward ends 37a of beams 37 move laterally with the axle 23 and the axle assumes an acute angle with the beams. The sliding connection of the beam extensions 37a with the ball elements 39 in the ball and socket members 38, and the rotatability of the ball within the sockets, permits the necessary movement for the front wheels to adjust to the arc of the turn. The rear wheels will also adjust to the arc of the turn through the provision of the universal pivot provided by the rear draft bearing 29 and the sliding and universal pivot connection of the rear beam extensions 37b with the rear axle 24 through ball and socket members 38.

The beams 37 being fixed laterally between guides 45 and 46 (but pivoted therein in a horizontal plane) insures that the angular movement of rear axle 24 with respect to the trailer will be equal to that of the front axle 23, thus bringing the rear wheels into a position where they are tangent to a radius $R_2$ from the turn center C and preventing them from assuming any other position. It will thus be evident that in a turn of any radius up to the maximum for which the trailer is designed, as limited by stop flanges S, the front and rear axles will assume an angular position relative the frame such that both the front and rear wheels will be centered on and tangent to radii drawn from the center of the turn and that the turn center C will always lie in line R through the center X of the suspension assembly.

As in the case of straight line movement of the vehicle any supplemental side forces acting against the front and rear wheels during turning movement are transmitted to the frame through the beams 37 and their guide members 45 and 46 without affecting the angular position of the axles 23 and 24 relative to the frame.

The turn characteristics of the vehicle are likewise unaffected by changing ground contours in the paths of the wheels. As will be noted from Figs. 14 and 15 the front and rear axles are capable of independent vertical and angular movement relative to one another. This is due to the independent universal pivoting of the axles to the frame through the draft bearings 29; to the sliding and universally pivotal connection of the beam ends 37a and 37b with the axles; and to the universal pivoting of beams 37 in the guide members 45 and 46. Even though the axles 23 and 24 may be in the turn position illustrated in Fig. 13, the wheels are free to adjust to changing ground contours, the limits being defined by the stop plates P and bumpers B previously described. Of course, it will be evident that the adaptation of the wheels to changing ground contours is obtained in straight line travel as well as during turns.

Figure 15:
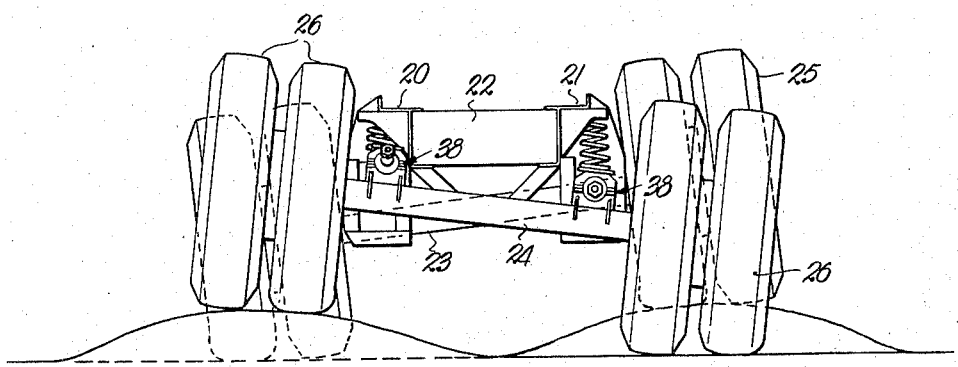
Fig. 15 is a schematic rear end view of the unit illustrating the freedom of vertical articulation of the wheels and axles in moving over irregular terrain.

As is believed evident from the showing of Fig. 15, at any time that the axles 23 and 24 are moved out of parallelism, there is a slight "pulling in" of the beam ends toward one another, this being due to the fact that guides 45 and 46 maintain the centers of the beams at a fixed spacing while the ends of the beams are carried on the axles and move about a hypothetical center which is approximately at the midpoint of the axles. However, the inherent "give" in the beams and in the sliding connection between the beams and their guides 45 and 46 has been found more than enough to permit the axles to move freely in the directions described without binding at the sliding connections, whether for the beams or axles. If there appears to be any undesirable binding, the slides 45b and 46b can be made of resilient sheet metal bent to the form shown and described, thus to provide for a slight lateral movement of the beams 37 under the conditions set forth.

It is a particularly valuable feature of my invention that the angular vertical movement of the axles 23 and 24 is obtained without affecting to any great degree the level position of the trailer frame. This is due primarily to the fact that the points of support for the frame (the springs 40) are centered on the midpoints of beams 37 which move vertically only a limited distance under any condition of operation. By virtue of the equidistant spacing of the midpoints of the beams 37 between axles 23 and 24, a lift of twelve inches at the front wheels will result in only six inch lift at the center of the beam and hence only a lift of a maximum of six inches of the frame assuming that the lift is so gradual that it would not be absorbed in the inertia of the trailer and compressive displacement of springs 38. Thus it will be seen that under average conditions of roughness of ground contour the trailer will remain substantially level despite marked articulation of the axles and beams.

Another point which should be noted is that the articulation of the axles illustrated in Figs. 14 and 15 results in a uniform distribution of the trailer load to all four of the dual wheel assemblies. This is true so long as the permissible limits of movement of the beam ends in their ball and socket joints 38 are not reached.

Due to the connecting of the axles 23 and 24 through forwardly located draft bearings 29, the application of braking forces to the wheels is absorbed in the draw bars 27 and 28 and the draft bearings rather than in the articulating members. This is of value in maintaining freedom of movement at the ball and socket connections 38. Furthermore, the independent absorption of the torque reaction at each axle prevents what is familiarly known as "crow hopping" of the vehicle when the brakes are applied.

While the description of the operation of my invention has been in connection with a trailer suspension in which the wheels are capable of "tracking" on turns, it will be understood that the independent up and down movement of the axles and their articulation in what may be called a substantially vertical plane as shown in Fig. 15 is independent of the free tracking feature. In other words, the wheels have the ability to follow the ground contours when the axles 23 and 24 remain in a vertical plane normal to the center line of the trailer as shown in Fig. 12. The only thing necessary to the articulation as shown in Fig. 15 is that the draft bearings provide for pivoting of the draw bars 27 and 28 about an axis parallel with the center line of the vehicle and an axis transverse to the center line and parallel with the wheels. The sliding and universally pivotal connection of the beams 37 with the axles permits free movement thereof to the extent necessary to obtain the result desired.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a tandem trailer assembly, an elongate frame, two tandem axles spaced longitudinally of said frame and providing a forward and a rear axle, two pairs of wheels, one pair on each axle, a draft tongue for each axle extending forwardly thereof, means universally pivoting the forward end of each draft tongue to said frame to provide for independent angular movement of the axles relative to one another, a pair of spaced fore-and-aft beams spanning said axles, means universally pivoting the end portions of said beams to the respective axles, said means constructed and arranged to permit movement of said end portions relative to said axles in a direction transverse to said axles, two pairs of spaced guide members, one on each side of said frame, the respective guide members extending downwardly on opposite sides of the respective beams whereby each beam is disposed between a pair of said guide members, means forming with said guide members a universal pivot for each beam, said means being constructed and arranged to permit upward and downward movement of said pivot relative to said guide members and yieldable means interposed between said frame and beams and supporting said frame thereon.

2. In a tandem trailer assembly, an elongate frame, two tandem axles spaced longitudinally of said frame and providing a forward and a rear axle, two pairs of wheels, one pair on each axle, a draft tongue for each axle extending forwardly thereof, means universally pivoting the forward end of each draft tongue to said frame to provide for independent angular movement of the axles relative to one another, a pair of spaced fore-and-aft beams spanning said axles, means universally pivoting the end portions of said beams to the respective axles, said means constructed and arranged to permit movement of said end portions relative to said axles in a direction transverse to said axles, two pairs of spaced guide members, one pair on each side of said frame extending downwardly on opposite sides of the central portions of the respective beams whereby each beam is disposed between a pair of said guide members, pivot means associated with each beam and cooperating to form a universal pivot for each beam, said pivot means and guide member being constructed to permit up and down movement of the beam between said guide members while maintaining the pivotal mounting of the beam relative thereto, and yieldable means interposed between said frame and beams and supporting said frame thereon.

3. In a tandem trailer assembly, an elongate frame, two tandem axles spaced longitudinally of said frame and providing a forward and a rear axle, two pairs of wheels, one pair on each axle, a draft tongue for each axle extending forwardly thereof, means universally pivoting the forward end of each draft tongue to said frame to provide independent angular movement of the axles relative to one another, a pair of spaced fore-and-aft beams spanning said axles, means universally pivoting the end portions of said beams to the respective axles, said means constructed and arranged to permit movement of said end portions relative to said axle in a direction transverse to said axle, two pairs of spaced guide members, one on each side of said frame and connected therewith, the respective guide members extending downwardly on opposite sides of the respective beams whereby each beam is disposed between a pair of guide members, inwardly concave and vertically elongated arcuate bearing surfaces on those sides of the guides confronting the beams, convex bearing members mounted on the sides of the beams and turnable about a vertical axis between the guides while also slidable up and down to thus permit up and down movement of the beams between the guides, bearing means connecting each of said bearing members with their respective beams so that the beams are pivotal with respect to the bearing members about a horizontal axis intersecting said vertical axis at right angles, and resilient means interposed between said frame and beams and supporting the frame on the beams.

4. A tandem trailer assembly as in claim 3 wherein said resilient means comprises coil springs in compression.

5. A trailer assembly as in claim 3 wherein each said bearing means comprises a cylindrical boss projecting from the beam and received in a rotatable fit in a mating socket formed in the bearing member.

6. In a tandem trailer assembly, an elongate frame, two tandem axles spaced longitudinally of said frame, two pairs of wheels, one pair on each axle, draft means associated with each axle and universally pivoting the axles to the frame for independent angular movement relative to one another, a pair of spaced beams transversely spanning said axles, means universally pivoting the end portions of said beams to the respective axles, said means constructed and arranged to permit movement of said end portions relative to said axles in a direction transverse to said axles, resilient means interposed between the centers of said beams and said frame and transmitting the weight of the frame to the beam, and connecting means between said frame and said beams and universally pivoting said beams relative to the frame, said connecting means including rigid guide members positioned on opposite sides of said beams in bearing contact therewith and operable to transmit loads imposed on the beams in directions transverse to the frame directly to the frame without imposing side stress on said resilient means.

7. In a tandem trailer assembly, an elongate frame, two tandem axles spaced longitudinally of the frame, two pairs of wheels, one pair on each axle, draft means associated with each axle and universally pivoting the axle to the frame for independent angular movement relative to one another, a pair of spaced beams transversely spanning said axles, means universally pivoting the end portions of the beams to the respective axles while permitting movement of said end portions relative to said axles in a direction transverse to said axles, spring elements interposed between said beams and said frame to resiliently transmit the weight of the frame to said beams, and rigid means connected with the frame and disposed on opposite sides of each beam and having bearing contact with the beams for absorbing and transmitting directly to the frame, independently of said spring elements, any side loads imposed on said beams tending to displace said beams relative to said frame.

References Cited in the file of this patent

UNITED STATES PATENTS

| | | |
|---|---|---|
| 2,193,567 | Pointer | Mar. 12, 1940 |
| 2,493,004 | Mackie | Jan. 3, 1950 |
| 2,523,954 | Jungwirth | Sept. 26, 1950 |
| 2,750,201 | Hagedorn | June 12, 1956 |